Patented Aug. 18, 1936

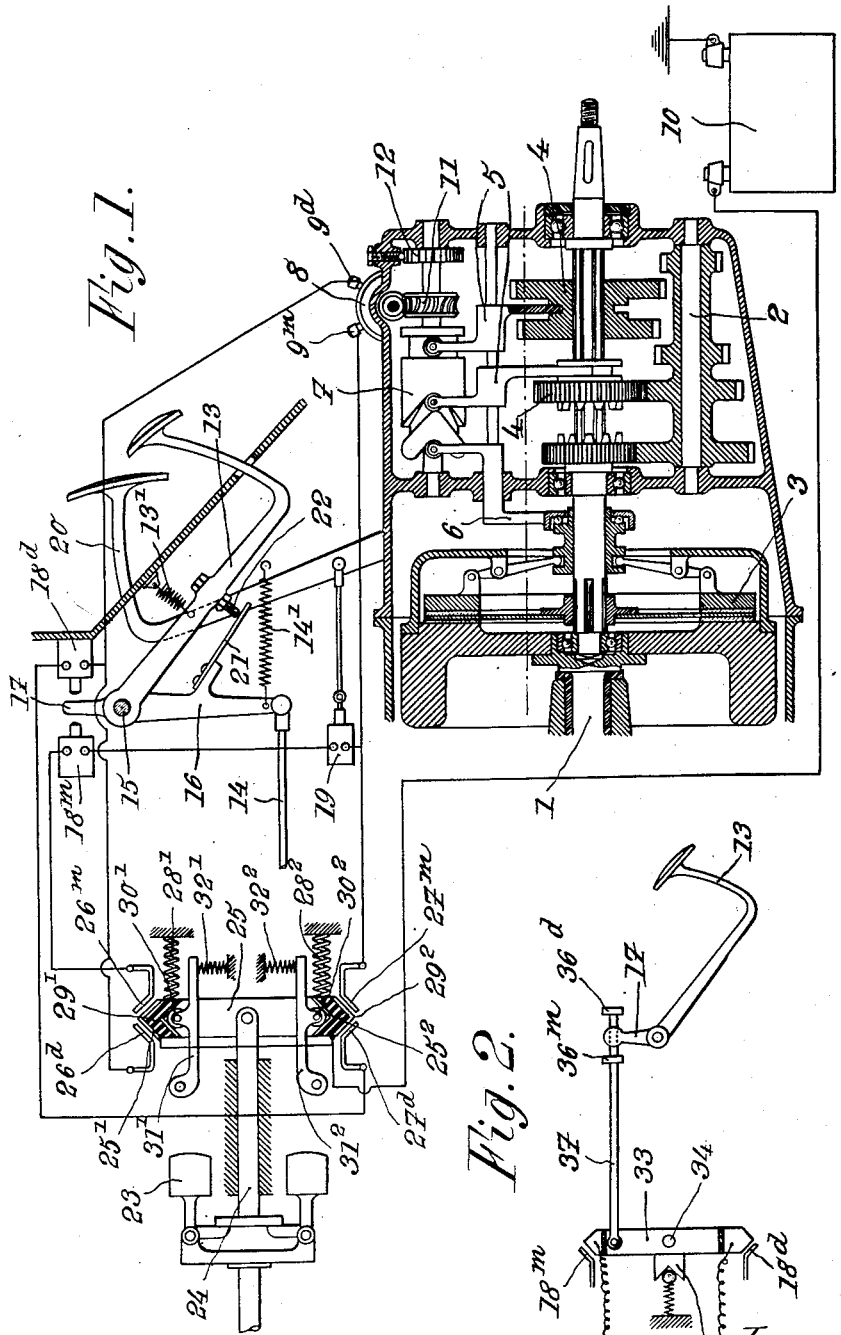

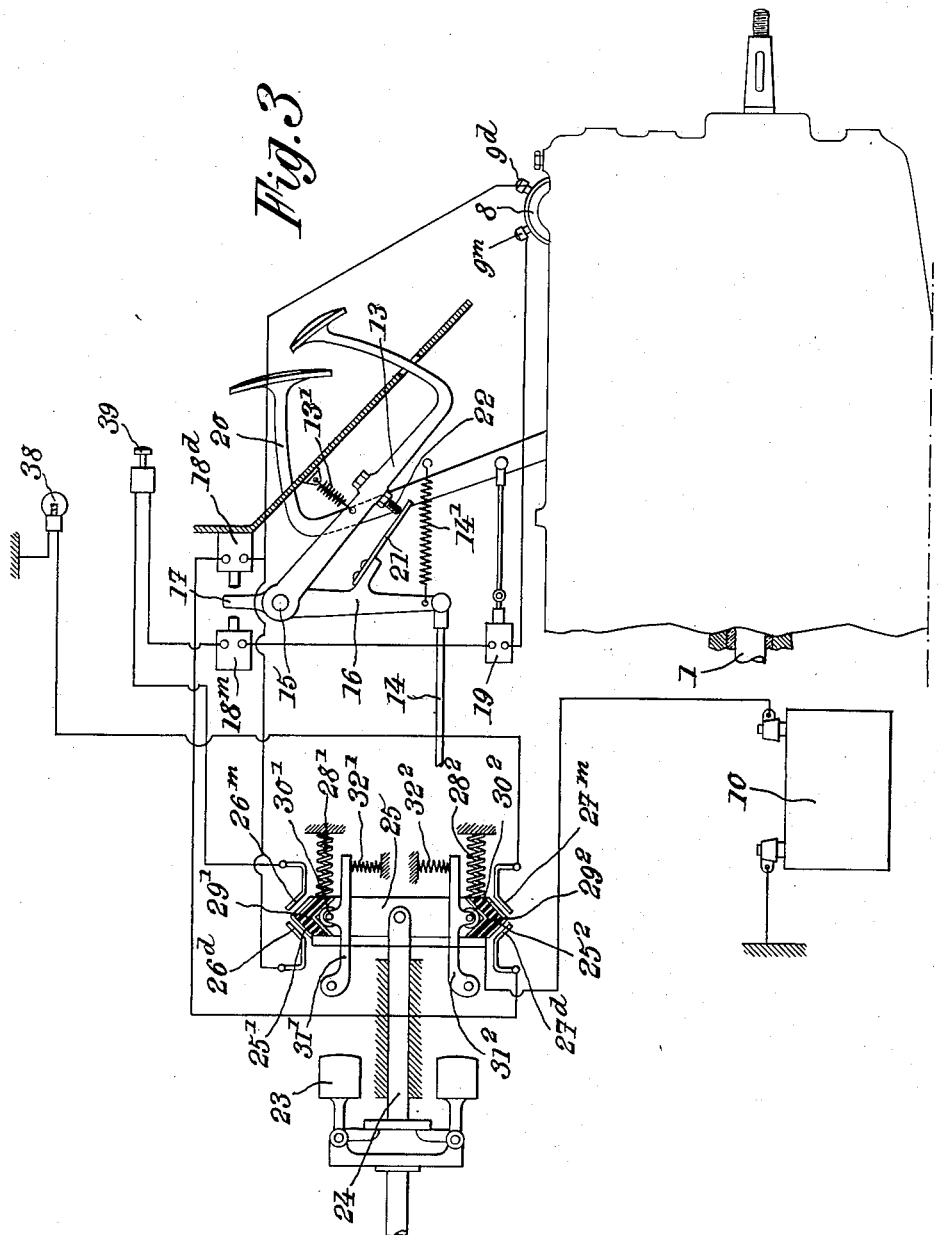

2,051,553

UNITED STATES PATENT OFFICE 2,051,553

CONTROL DEVICE FOR VARIABLE RATIO TRANSMISSIONS

Gaston Fleischel, Bleneau, France

Application July 6, 1934, Serial No. 734,067
In Belgium May 24, 1934

24 Claims. (Cl. 74—472)

The present invention relates to control devices for variable ratio transmissions of the type in which the driver decides and brings about, by a certain action, the changing to a higher or lower gear, the operations that are necessary for this change of gear being then performed through the action of a source of auxiliary energy, such as a servo-motor. The present invention is more especially, but not exclusively, concerned with devices of this kind that include the gear box of an automobile vehicle.

The object of the present invention is to provide a simplified control device of the type above referred to, the simplification lying, in particular, in the fact that the device does not require, from the driver, any special action for the control of the transmission after he has started the vehicle running in the desired direction. Another object of the invention is to improve the safety concerning the starting and the working of the organs that change from one gear to another, even in case of failure or mistake of the driver.

According to the present invention, the mechanism which, in devices of the type above referred to, brings about the operations that modify the gear ratio of the transmission is directly controlled by the movements of the organ, for instance the throttle pedal, on which the driver acts for controlling the working conditions of the engine that cooperates with the transmission, by providing, for said organ, an action on the organs that control the transmission, at suitably chosen points of its stroke.

According to another feature of the present invention, I combine with the control device above mentioned means operative by at least one functional factor of the transmission, for instance the speed of revolution of the driving shaft, for neutralizing the effect of an action of the driver when the latter would change into a gear that would be unfavorable to the working of the engine.

Another feature of the invention consists in combining, with control devices of the type above mentioned, means operative by at least one of the functional factors of the transmission, for instance the speed of revolution of the driving shaft, for acting directly and automatically on the mechanism that performs the operations necessary for passing from one gear to another, when the engine, due to failure or mistake of the driver, tends to be working under conditions for which it is not made.

Still another feature of the present invention consists in combining with control devices of the type above mentioned means operative by at least one functional factor of the engine and its transmission, for instance the speed of revolution of the driving shaft, for warning the driver, by a suitable signal, that he should perform a certain operation for changing to another gear.

Other characteristic features of the present invention will appear from the following detailed description of an embodiment thereof.

Preferred embodiments of the present invention will be hereinafter described with reference to the accompanying drawings, given merely by way of example and in which:

Fig. 1 is a diagrammatic view showing a portion of a transmission for an automobile vehicle, with a control device according to the invention;

Fig. 2 is a part view of a modification of this device.

Fig. 3 is a diagrammatic view of a further modified form of the device.

The transmission proper is of any suitable type and, for instance, it includes, in the usual manner, an operating organ (which plays the part of the usual gear lever or is operatively connected therewith) which may be brought into any of several distinct characteristic positions for each of which a different gear is engaged. For the sake of simplicity, it will be hereinafter assumed that the operating organ consists of a rotary shaft (for instance a cam shaft) which, when turned through a certain angle in one direction, corresponds to changing to a higher gear while its rotation in the opposite direction corresponds to changing to a lower gear. However, I wish it to be well understood that the specific arrangement, disposition and form of the parts of the gear box shown in the drawings (and which might be of the progressive type as well as the non-progressive type) and also the manner in which said box cooperates with the clutch or clutches that may be provided between the gear box and the engine do not limit the scope of my invention which, with a suitable adaptation which can easily be made by anyone skilled in the art, is applicable in all cases.

In the specific embodiment shown by Fig. 1, I provide, between the driving shaft 1 and the gear box 2, which is supposed to be of the non-progressive type, a single clutch 3. The gear box is provided with sliding gears 4 operated by means of forked levers 5. These forked levers and also the organ 6 through which clutch 3 is controlled are actuated through a cam shaft 7. The latter is caused to rotate in either direction by means of a servo-motor of any suitable type, for instance a rotary shaft driven by the engine, an electric motor, a servo-motor operated by pressure or suction, etc. In order to obtain a rotation of the shaft in the desired direction, I eventually provide, between said servo-motor and shaft 7, a mechanical, electrical or other reversing device.

In the example shown by the drawing, the servo-motor consists of an electric motor 8 rotating in one direction or in the opposite one according as it is fed with electric current through terminal $9^d$ (which corresponds to changing to a lower gear) or through terminal $9^m$ (which corresponds to changing to a higher gear) when one or the other of these terminals is connected to the source of electric current through the means that will be hereinafter described. The shaft of electric motor 8 drives, through a speed reducing gear 11, cam-shaft 7. A braking or locking device 12 is provided for stopping said cam-shaft in any of its characteristic positions.

According to the present invention, the driver causes servo-motor 8 to turn in the desired direction, by utilizing, in a suitable manner, the movements that he normally imparts to the organs through which the running of the vehicle is permanently controlled by said driver, and especially the throttle pedal 13 through which the engine that drives the transmission is controlled.

Accordingly, instead of positively connecting said pedal with the rod 14 which acts on the organ (throttle) that controls the feed of fuel to the engine, I arrange said pedal so that it pivots about a spindle 15 which may also support an arm 16 the end of which is jointed to said rod 14. A spring $13^1$ urged pedal 13 toward its upper position and a spring $14^1$ tends to keep rod 14 in the position for which the organ above mentioned (throttle) is closed.

Pedal 13 carries a finger 17 which, in the course of the displacements of said pedal, is moved between the control organs of two make and break devices $18^d$ and $18^m$, which are normally open (therefore cutting off the current) and are inserted between the source of energy 10 and the terminals $9^d$ and $9^m$ of the electric servo-motor 8.

In the circuit connecting make and break $18^m$ to terminal $9^m$ I advantageously insert a circuit breaker 19 controlled from a distance by the driver and preferably by means of the pedal 20 of the main clutch which is operated for periods of starting or stopping. With this arrangement circuit breaker 19 automatically opens the circuit as long as pedal 20 is in the position corresponding to the clutch being disengaged.

It should be noted that the fact of changing from one gear to another through the operation of the throttle pedal does not dispense the driver from operating directly the gear box for controlling running in the forward direction, reverse gear and neutral.

Circuit breaker 19 may also be operated through the control organ that is provided for the just above mentioned operations, so that said circuit breaker is closed only when the gear has been placed in a position corresponding to the vehicle running in the forward direction.

On arm 16, which is operatively connected to the organ for varying the feed of fuel to the engine (throttle) I provide an elastic member, for instance a blade 21, the function of which will be hereinafter explained and on which an adjustable push-piece 22, carried by pedal 13, is adapted to act when said pedal is depressed.

When the various organs above described are suitably adjusted, the device works in the following manner:

Before starting the vehicle (the engine being running idle) pedal 13 is in its upper position and finger 17 maintains make and break $18^m$ in the closed position, which would correspond to electric current being fed to terminal $9^m$ if circuit breaker 19 were not open due to the fact that the gear box is in neutral or that clutch pedal 20 is depressed. By allowing clutch pedal 20 to move upwardly, when the vehicle is being started, or by changing to first gear, the driver indeed closes the circuit $18^m$—$9^m$, which would start servo-motor 8 and correspond to changing to the higher gear (second gear) if, by simultaneously depressing throttle pedal 13, the driver did not cut off the circuit at $18^m$. In the course of the same movement, the driver brings push-piece 22 into contact with flexible blade 21, so that the engine is fed with fuel as in the ordinary arrangement because blade 21 is sufficiently rigid for overcoming the resistance of spring $14^1$.

If the engine is not sufficiently loaded, the driver has a tendency to lift his foot so as to permit pedal 13 to move upwardly. The device can be adjusted in such manner that, before the end of this stroke, the feed control organ of the carburetter is closed; push piece 22 ceasing to act on flexible blade 21, finger 17 comes into contact with make and break $18^m$, which corresponds to changing to the immediately higher gear, that is to say the second gear, and so on.

If the full opening of the throttle is not sufficient, the driver instinctively further depresses pedal 13. As rod 14 and arm 16 cannot be moved farther, due to the fact that the throttle is stopped in the open position, push-piece 22 causes blade 21 to be bent and finger 17 closes make and break $18^d$ which causes passing to lower gear.

Therefore, by acting on the throttle pedal, it is possible to control, through logical movements, the gear changes, the operations that are necessary for this purpose being performed by servo-motor 8.

Besides I might choose, for changing into higher, and even lower, gears, any other intermediate position of pedal 13 by arranging the connections, in the manner described for push piece 22 and flexible blade 21, in such manner that the normal working of the carburetter is not interfered with. For this purpose it suffices that make and break devices $18^m$ and $18^d$, when they are closed, do not act as abutments that stop the movements of the fuel inlet control organ (throttle). This result can easily be obtained, for instance by making these make and break devices in such manner that they are controlled through a kind of push piece adapted to slide rather freely between suitable contacts. It should further be noted that, if the action of pedal 13 on make and break $18^d$ takes place a short time before the full opening of the engine throttle, it becomes unnecessary to provide elastic organs such as blade 21.

This semi-automatic control of the variable ratio transmission is already very advantageous for practical purposes.

It may be further combined with fully automatic means, as already proposed by me. In this case, the device above described would constitute a means of checking the working of the automatic means. The latter can perform an operation only if the driver permits it by a suitable movement.

Besides, this combination might be only partial by being applied to only a portion of the automatic means that are considered. It may also be merely temporary because a control organ, for instance a handle, adapted to be operated by the driver, permits the latter to choose the running of the vehicle, either with automatic control, or with semi-automatic control, or again with the combination of these controls.

My invention also contemplates the provision of automatic means for correcting the mistakes or blunders of the driver.

It should be remembered that a change of gear corresponds to an increase of the speed of revolution of the engine when changing to a lower gear, and to a decrease of this speed of revolution, when changing to a higher gear.

In the case of a transmission in which the gear ratio can be progressively varied (which is not the case of the gear box illustrated by Fig. 1) it may be considered that the engine has two extreme limits of working, to wit a lower limit $v^2$ and a higher limit $V^1$.

When the speed of revolution of the engine tends to drop below its lower limit $v^2$, it is obviousy necessary to reduce the gear ratio so as to prevent the speed of revolution of the engine from further decreasing.

With the device as above described, this corresponds to two conditions, which may be complied with either simultaneously or separately, to wit:

(a) To prevent the driver from then increasing this ratio, and, for this purpose, it suffices to cut off circuit $10$—$18^m$—$9^m$, which is the only one through which this increase of the gear ratio might be obtained;

(b) To automatically reduce this ratio, if the driver does not realize that he is at the lower limit of working of the engine and if he does not perform the necessary operation.

On the contrary, if the speed of revolution of the engine reaches its higher limit $V^1$, the gear ratio should be increased, which corresponds to the two following conditions:

(a) To prevent the driver from reducing this ratio, which can be obtained by opening circuit $10$—$18^d$—$9^d$;

(b) To automatically increase said ratio by automatically connecting electric source $10$ to terminal $9^m$ of the servo-motor.

In order to comply with these conditions, it suffices to bring into play one or several variable functional factors of the engine or of the transmission and to make use of the resultant of the actions or effects of these factors in a manner similar to that which will be hereinafter explained with reference to a particularly simple embodiment of my invention.

I provide, in connection with the engine, a centrifugal governor 23 capable of imparting axial displacements to a push piece 24, which is suitably guided.

A distributing lever 25 is jointed with the free end of said push-piece. Both ends $25^1$ and $25^2$ of said lever 25 are made to conduct electricity and are connected to the source $10$ of electrical energy.

Opposite said ends of lever 25 and on either side thereof, I provide stationary contacts $26^m$—$26^d$ and $27^m$—$27^d$. Contacts $26^m$ and $27^d$ are inserted in series with terminals $18^m$ and $18^d$ respectively and contacts $26^d$ and $27^m$ are directly connected to terminals $9^d$ and $9^m$ respectively.

One of the ends of lever 25, for instance $25^2$ is subjected to the action of a spring $28^2$, which is stronger than the spring $28^1$ which acts on the other end $25^1$ of said lever.

It follows that when governor 23 is in the position of rest or if the engine tends to run at a speed lower than $v^2$, the centrifugal force that is developed is insufficient for overcoming the resistance of springs $28^1$ and $28^2$ and lever 25 is applied against both of the contacts $26^d$ and $27^d$. The electric current that flows through $25^2$—$25^1$—$26^d$ and $9^d$ causes the servo-motor to rotate in a direction that corresponds to a reduction of the gear ratio, so that the speed of the engine tends to increase. Contact $27^d$, which is connected to make and break $18^d$, makes it possible for the driver to act in the same direction, but as the feed of terminal $9^m$ (through $27^m$) and of make and break $18^m$ (through $26^m$) is then cut off, the driver cannot increase the gear ratio.

When the speed of revolution of the engine has exceeded the lower limit $v^2$, the centrifugal force of the governor is capable of overcoming the resistance of spring $28^1$ but not that of spring $28^2$, so that lever 25 becomes inclined and opens contact $26^d$ while closing contact $26^m$. The driver therefore is free of his decision concerning the increase or the decrease of the gear ratio, since contact $26^m$ and $27^d$, which are connected to make and break devices $18^m$ and $18^d$ respectively, are closed. On the contrary, the automatic action of the device is stopped because contacts $26^d$ and $27^m$ are open for a normal running of the vehicle.

When the speed of revolution of the engine reaches its higher limit $V^1$, the centrifugal force overcomes the resistance of spring $28^2$ and closes contact $27^m$ while opening contact $27^d$. Consequently, the driver cannot reduce the gear ratio because, as contact $27^d$ does not any longer feed make and break $18^d$, the latter cannot have any action when it is closed by the driver. However, the driver can increase the gear ratio because contact $26^m$ still feeds current to make and break $18^m$. In case the driver forgot to thus modify the gear ratio, this is automatically made by the device because contact $27^m$ directly feeds current to the terminal $9^m$ of the servo-motor. For decreasing speeds of the engine, the operations above described are reversed.

Of course, it is possible, if desired, to do away with contacts $26^m$ and $27^d$ so as to keep only the contacts designated by reference characters $26^d$ and $27^m$, which correspond to the operations that must necessarily take place.

Advantageously, the bearing surfaces of the contacts, such as $26^d$ and $26^m$ are given a certain slant with respect to the axis of lever 25, so as to increase the pressure exerted on these contact surfaces.

Springs $28^1$ and $28^2$ can be replaced by a single spring, the action of which is equal to the resultant of these two springs, and which is provided at the place where this resultant is applied.

When the gear box is of the type shown by Fig. 1, that is to say corresponds to a limited number of distinct combinations of gears, the mechanism above described must be completed by supplementary devices as hereinafter explained.

In this case, the lower limit $v^2$ of the speed of revolution of the engine remains, and when this limit is reached or the speed of the engine tends to drop below it, it is advisable to change to the next lower gear, either through the action of the driver, who depresses pedal 13 until make and break $18^d$ is brought into action, or through the automatic control by the closing of contact $26^d$. On the contrary, the possibility, for the driver, of changing to a higher gear must be rendered possible only for a speed $v^1$ of the engine higher than $v^2$ and such that the speed of the vehicle is the same for the combination of gears that is utilized as for the immediately higher gear combination with speed $v^2$ of the engine. This implies that contact $26^m$ must be closed only for speed $v^1$ of the engine, while contact $26^d$ must close for speed $v^2$.

In a likewise manner, contact $27^d$ must be closed only when the speed of the engine drops below a value $V^2$ for which, with the gear combination that is used, the engine drives the vehicle at the same speed as that obtained with a speed $V^1$ of the engine for the next lower gear combination.

It is therefore necessary to modify the device in such manner that contact $26^d$ is closed for speed $v^2$ of the engine, contact $27^m$ is closed for speed $V^1$, contact $26^m$ is closed when the speed exceeds $v^1$ and contact $27^d$ is closed when the speed of the engine exceeds $V^2$.

This result can be easily obtained by any of the devices described by me in my prior patents, and for instance as shown by Fig. 1.

On lever 25, and preferably close to either end thereof, I provide projections $29^1$ and $29^2$ each consisting of two rectilinear ribs making a certain angle with each other, as shown by the drawings. In the angle of each of these projections I provide a roller $30^1$—$30^2$ carried by an oscillating lever $31^1$—$31^2$ respectively, subjected to the action of a spring $32^1$—$32^2$ respectively.

By suitably choosing the strengths of springs $32^1$ and $32^2$ and the angular position of the elements of projections $29^1$ and $29^2$ I obtain that the rollers exert a certain action on lever 25 when the latter tends to be moved away from its intermediate position, said action tending to oppose the displacement of lever 25 as will be hereinafter explained.

If the different values of the centrifugal force developed by governor 23 for speeds $v^1$, $v^2$, $V^1$ and $V^2$ are $f^1$, $f^2$, $F^1$ and $F^2$ respectively, the strength of spring $28^1$ is chosen to balance force $$\frac{f^1+f^2}{2}$$

and the strength of spring $28^2$ is chosen to balance force $$\frac{F^1+F^2}{2}$$

On the other hand, springs $32^1$ and $32^2$ are so chosen as to have strengths equal to $$\frac{f^1-f^2}{2}$$

and $$\frac{F^1-F^2}{2}$$

respectively. Rollers $30^1$ and $30^2$ tend to maintain lever 25 half way between the contact disposed on either side thereof, that is to say in the position shown by Fig. 1.

If the rollers did not act, the centrifugal forces which would condition the equilibrium of lever 25 and therefore the closing of the various contacts would be $$\frac{f^1+f^2}{2}$$

and $$\frac{F^1+F^2}{2}$$

With the rollers, the equilibrium of the two ends of lever 25 and therefore the displacements, in one direction, of said ends are obtained for the following values:

$$\frac{f^1+f^2}{2}+\frac{f^1-f^2}{2}$$

and $$\frac{F^1+F^2}{2}+\frac{F^1-F^2}{2}$$

and, in the opposite direction, for the following values:

$$\frac{f^1+f^2}{2}-\frac{f^1-f^2}{2}$$

and $$\frac{F^1+F^2}{2}-\frac{F^1-F^2}{2}$$

It follows that these values are indeed $f^1$, $F^1$, $f^2$ and $F^2$, corresponding to the speeds of revolution $v^1$, $V^1$, $v^2$ and $V^2$.

The addition of the rollers $30^1$ and $30^2$ therefore permits of obtaining the desired result.

In Fig. 2, I have shown, by way of example, a modification of the arrangement of break and make devices $18^m$ and $18^d$, this figure showing how these devices are controlled by pedal 13. In this case, the two make and break devices are combined into a single one provided with a double contact and controlled from a distance through pedal 13.

A lever 33, both ends of which are capable of conducting electricity and are connected to a source of electrical energy 10, is adapted to oscillate about a spindle 34. I provide a locking device 35 adapted to cooperate with this lever 33 so as to elastically maintain it in a position in which it is in contact neither with $18^m$ nor with $18^d$. In order to incline this lever in one direction or in the opposite one so as to close the corresponding contact, I act on said lever through a rod 37 provided with two stops $36^m$ and $36^d$ between which moves a finger 17 carried by pedal 13. It will readily be understood that acocrding to the position of said pedal, either contact $18^m$ or contact $18^d$ is closed, as in the embodiment of Fig. 1.

I may also provide an articulation without a sliding displacement between rod 37 and pedal 13 and choose the interval between lever 33 and contacts $18^m$ and $18^d$ in such manner that the closing of the corresponding circuit takes place only at the desired time.

I may also replace rod 37 by a flexible connection between pedal 13 and lever 33, this connection consisting for instance of a flexible wire moving in a sheath made, in the known manner, of a metal wire helically wound so that its spires are in contact with one another, the inner diameter of this sheath being slightly larger than the diameter of the first mentioned wire.

I may also modify the arrangement above described, as shown in Fig. 3, in such a manner that for one type of operation, as for changing to a higher gear, an oversight on the part of the driver merely causes a warning, as by connecting contact $27^m$ to a light 38, while, for another type of operation, as for changing to a lower gear, an operation which should be performed instantaneously when necessary, the automatic means directly operate the control elements of the gear box.

In this case, the device may be modified in such a manner that make and break $18^m$ is under the operative control of the throttle pedal and a supplementary make and break 39 is provided in series with make and break 18ᵐ and so positioned that it can be directly operated by the driver. If this supplementary make and break is kept in the closed position, the operation is the same as described above for Fig. 1. If, on the contrary, this supplementary make and break is kept in the open position, the driver must close it whenever he wishes to change to a higher gear.

While I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In a system including an engine and a variable ratio transmission driven by said engine, the combination of a mechanism for changing the gear ratio of said transmission, a servo-motor for operating said mechanism, control means for said servo-motor, means for controlling the working of said engine, means for operatively connecting the two above mentioned means with each other, whereby the changing from one gear to another is automatically produced by the operation of the means for controlling the working of the engine, and governing means, responsive to variations of at least one functional factor of the system and normally inoperative on said servo-motor, for checking the action of said control means on said servo-motor when the engine would be called upon to work under unfavorable conditions.

2. In a system including an engine having a driving shaft and a variable ratio transmission driven by said engine, the combination of a mechanism for changing the gear ratio of said transmission, an electric servo-motor for operating said mechanism, two input terminals for said servo-motor corresponding to its working in opposite directions when fed through said terminals respectively, a source of electric current, a contact for connecting said source with one of said terminals, a contact for connecting said source with the other terminal, and governing means, responsive to variations of the speed of revolution of said driving shaft, for automatically bringing one of said contacts into operation when said engine is working under unfavorable conditions, whereby said mechanism is caused to change the gear ratio of the transmission so as to place the engine under better conditions of working.

3. In a system having an engine including a driving shaft and a variable ratio transmission driven by said engine, the combination of a mechanism for changing the gear ratio of said transmission, an electric servo-motor for operating said mechanism, two input terminals for said servo-motor corresponding to its working in opposite directions when fed with current through said terminals respectively, a make and break device connected with each of said terminals respectively, means for operating said make and break devices so as to permit of controlling said servo-motor, a contact for connecting said source with one of said make and break devices, a contact for connecting said source with the other make and break device, and governing means responsive to variations of the speed of revolution of said driving shaft for automatically opening one of said contacts so that current cannot be fed to the corresponding terminal of the servo-motor, whatever be the position of the corresponding make and break, when the energizing of said last mentioned terminal would cause the mechanism to change to a gear for which the engine is placed under unfavorable conditions.

4. In a system including an engine having a driving shaft, and a variable ratio transmission driven by said engine, the combination of a mechanism for changing the gear ratio of said transmission, an electric servo-motor for operating said mechanism, two input terminals for said servo-motor corresponding to its working in opposite directions when fed with current through said terminals respectively, a make and break device connected with each of said terminals respectively, means for operating said make and break devices so as to permit of controlling said servo-motor, two contacts for connecting said source with said make and break devices respectively, two other contacts for directly connecting said source with said terminals respectively, and governing means, responsive to variations of the speed of revolution of said driving shaft, for both automatically opening one of the two first mentioned contacts when the energizing of the corresponding terminal would cause the mechanism above mentioned to change to a gear for which the engine is placed under unfavorable conditions, and automatically closing one of the two second mentioned contacts when the engine is working under unfavorable conditions and the energizing of the terminal corresponding to the last mentioned contact causes said mechanism to change to a gear for which said engine is placed under better conditions of working.

5. A combination according to claim 4 further comprising means for controlling the working of said engine, and means for operatively connecting said last mentioned means with the means for operating said make and break devices.

6. In a system including an engine having a driving shaft, and a variable ratio transmission driven by said engine, the combination of a mechanism for changing the gear ratio of said transmission, an electric servo-motor for operating said mechanism, two input terminals for said servo-motor corresponding to its working in opposite directions when fed with current through said terminals respectively, a make and break device connected with each of said terminals respectively, means for operating said make and break devices so as to permit of controlling said servo-motor, means for controlling the working of said engine, means for operatively connecting the two last mentioned means with each other, two contacts connected with said make and break devices respectively, two contacts directly connected with said terminals respectively, a centrifugal governor mounted on said driving shaft, a movable member operatively connected with said governor, one of the ends of said member being disposed between one of the two first mentioned contacts and one of the two second mentioned contacts, the other end of said member being disposed between the two other contacts, in such manner that the two contacts that are located on the same side of said member are connected to the same terminal of the servo-motor, a source of current both of said ends of the movable member being electrically connected to said source of current, and elastic means, of different strengths, for opposing the displacements of the ends of said member under the action of said centrifugal governor, respectively.

7. A combination according to claim 6 further comprising means for elastically urging each end of said movable member toward an intermediate position between the two contacts between which said end is disposed.

8. A combination according to claim 4 further comprising a circuit breaker inserted between one of said make and break devices and the corresponding input terminal of the servo-motor.

9. A combination according to claim 4 further comprising a circuit breaker inserted between the input terminal of the servo-motor which corresponds to a changing to a higher gear and the corresponding make and break device, a clutch pedal, and means for operatively connecting said circuit breaker with said clutch pedal so that said circuit breaker is open when said clutch pedal is depressed.

10. In a system comprising a motor, a transmission mechanism, means connecting said motor to said transmission mechanism, means for controlling the performance of the motor, said means being adjustable within an operative range disposed between two limits at one of which the motor performance is at a maximum, while at the other limit it is at a minimum, a mechanism for changing the transmission ratio of the transmission mechanism, a servo-motor for actuating said ratio changing mechanism, a control device for controlling the servo-motor in the direction of increasing speeds, means acting on said control device and operatively connected to said motor controlling means for actuating said control device adjacent that limit of the operative range of said motor controlling means which corresponds to minimum motor performance, a second control device for controlling the servo-motor in the direction of decreasing speeds, and means acting on said second control device and operatively connected to said motor controlling means for actuating said second control device adjacent that limit of the operative range of said motor controlling means which corresponds to maximum motor performance.

11. In a system comprising a motor, a transmission mechanism having a plurality of definite transmission ratios, means connecting said motor to said transmission mechanism, means for controlling the performance of the motor, said means being adjustable within an operative range disposed between two limits at one of which the motor performance is at a maximum, while at the other limit it is at a minimum, a mechanism for changing the transmission ratio of the transmission mechanism, a servo-motor for actuating said ratio changing mechanism, a control device for controlling the servo-motor in the direction of increasing speeds, means acting on said control device and operatively connected to said motor controlling means for actuating said control device adjacent that limit of the operative range of said motor controlling means which corresponds to minimum motor performance, a second control device for controlling the servo-motor in the direction of decreasing speeds, and means acting on said second control device and operatively connected to said motor controlling means for actuating said second control device adjacent that limit of the operative range of said motor controlling means which corresponds to maximum motor performance.

12. In a system comprising a motor, a transmission mechanism, means connecting said motor to said transmission mechanism, means for controlling the performance of the motor, said means being adjustable within an operative range disposed between two limits at one of which the motor performance is at a maximum, while at the other limit it is at a minimum, a mechanism for changing the transmission ratio of the transmission mechanism, a servo-motor for actuating said ratio changing mechanism, a control device for controlling the servo-motor in the direction of increasing speeds, means acting on said control device and operatively connected to said motor controlling means for actuating said control device adjacent that limit of the operative range of said motor controlling means which corresponds to minimum motor performance, a second control device for controlling the servo-motor in the direction of decreasing speeds, and means acting on said second control device and operatively connected to said motor controlling means for actuating said second control device adjacent that limit of the operative range of said motor controlling means which corresponds to maximum motor performance, said servo-motor comprising an electric motor, and each of said control devices comprising an electric switch.

13. In a system comprising a motor, a transmission mechanism, means connecting said motor and transmission mechanism, means for controlling the performance of the motor, said means being adjustable within an operative range disposed between two limits at one of which the motor performance is at a maximum while at the other limit it is at a minimum, a mechanism for changing the transmission ratio of the transmission mechanism, a servo-motor for actuating said ratio changing mechanism, a control device for controlling the servo-motor in the direction of increasing speeds, means acting on said control device and operatively connected to said motor controlling means for actuating said control device adjacent that limit of the operative range of said motor controlling means which corresponds to minimum motor performance, a member which is operated at the beginning of the operation of the system, and means operatively connected to said last member to render said control device inoperative when said member is actuated.

14. In a system comprising a motor, a transmission mechanism, means connecting said motor and transmission mechanism, means for controlling the performance of the motor, said means being adjustable within an operative range disposed between two limits at one of which the motor performance is at a maximum while at the other limit it is at a minimum, a mechanism for changing the transmission ratio of the transmission mechanism, a servo-motor for actuating said ratio changing mechanism, a control device for controlling the servo-motor in the direction of increasing speeds, means acting on said control device and operatively connected to said motor controlling means for actuating said control device adjacent that limit of the operative range of said motor controlling means which corresponds to minimum motor performance, a clutch between said motor and said transmission mechanism, means for controlling said clutch, and means operatively connected to said clutch controlling means and operative by movement thereof to clutch disengaging position to render said control device inoperative to control said servo-motor.

15. In a system including an engine, a variable ratio transmission, means connecting said engine to said transmission, the combination of a mechanism for changing the gear ratio of said transmission, a servo-motor for operating said mechanism, control means for said servo-motor, means for controlling the operation of said engine, means for operatively connecting the two above mentioned means with each other, whereby the changing from one gear to another is automatically produced by the operation of the means for controlling the operation of the engine, a governing means, responsive to the speed of the engine and normally inoperative on said servo-motor, for checking the action of said control means on said servo-motor when the engine would be called upon to operate under unfavorable conditions.

16. In a system comprising a motor, a transmission mechanism, means connecting said motor to said transmission mechanism, means for controlling the performance of the motor, said means being adjustable within an operative range disposed between two limits at one of which the motor performance is at a maximum, while at the other it is at a minimum, a mechanism for changing the transmission ratio of said transmission mechanism, power operated means for operating said ratio changing mechanism, a pair of devices for controlling said operating means so that operation of one of said devices causes said ratio changing mechanism to change to a lower gear while operation of the other device causes it to change to a higher gear, said motor controlling means operating on one of said devices adjacent one of its limits so as to produce a change in the gear ratio, and on the other of said devices at a different point in its range.

17. In a system comprising a motor, a transmission mechanism, means connecting said motor to said transmission mechanism, means for controlling the performance of the motor, said means being adjustable within an operative range disposed between two limits at one of which the motor performance is at a maximum, while at the other it is at a minimum, a mechanism for changing the transmission ratio of said transmission mechanism, an electric servo-motor for operating said ratio changing mechanism, a pair of switches for controlling said servo-motor to turn in opposite directions to increase and decrease respectively the gear ratio, said motor controlling means operating on said switches to cause operation of said servo-motor, and a manually operable switch connected in series with the switch which causes operation of said servo-motor to higher gear ratio.

18. In a system including an engine having a driving shaft and a variable ratio transmission driven by said engine, the combination of a mechanism for changing the gear ratio of said transmission, an electric servo-motor for operating said mechanism, two input terminals for said servo-motor corresponding to its working in opposite directions when fed through said terminals respectively, a source of electric current, a contact for connecting said source with one of said terminals, a second contact, and governing means, responsive to variations of the speed of revolution of said driving shaft, for automatically bringing said first contact into operation when the speed of said engine drops, whereby said mechanism is caused to change the gear ratio of the transmission so as to place the transmission in a lower gear, a warning device connected to the other contact, said governing means bringing said second contact into operation when the speed of said engine becomes too great.

19. In a device as claimed in claim 15, said servo-motor being electric, said control means for the servo-motor comprising an electric circuit connected thereto, said governing means comprising means to break said circuit.

20. In a device as claimed in claim 16, said power operated means comprising an electric servo-motor, a source of current and a circuit connecting said servo-motor to said source of current, said controlling devices comprising switches connected in said circuit, and governing means controlled by the speed of the motor to render said controlling devices inoperative on said servo-motor when the energizing of said servo-motor would cause the transmission mechanism to change to a gear for which the motor is placed under unfavorable conditions.

21. In a device as claimed in claim 16, said power operated means comprising an electric servo-motor, a source of current and a circuit connecting said servo-motor to said source of current, said controlling devices comprising switches connected in said circuit, contacts one arranged in series with each of said switches, and governing means controlled by the speed of the motor to break at least one of said contacts and thereby prevent operation of the servo-motor when the energizing of said servo-motor would cause the transmission mechanism to change to a gear for which the motor is placed under unfavorable conditions.

22. In a device as claimed in claim 16, governing means responsive to variations at least one functional factor of the system for controlling said power operated means so as automatically to cause said last means to change the transmission mechanism to a gear for which said motor is placed under better conditions of working.

23. In a device as claimed in claim 15, said servo-motor being electric, said control means for the servo-motor comprising an electric circuit connected thereto, said governing means comprising means to break said circuit, and means controlled by said governing means for automatically causing said servo-motor to shift the transmission to a lower gear when the speed of the motor falls too low.

24. In a device as claimed in claim 16, said power operated means comprising an electric servo-motor, a source of current and a circuit connecting said servo-motor to said source of current, said controlling devices comprising switches connected in said circuit, contacts one arranged in series with each of said switches, and governing means controlled by the speed of the motor to break at least one of said contacts and thereby prevent operation of the servo-motor when the energizing of said servo-motor would cause the transmission mechanism to change to a gear for which the motor is placed under unfavorable conditions, a third contact connected to said servo-motor so that energizing thereof causes said servo-motor to shift the transmission mechanism to a lower gear, said governing means closing said third contact when the speed of the motor falls too low.

GASTON FLEISCHEL.